United States Patent Office 3,061,424
Patented Oct. 30, 1962

3,061,424
METHOD OF REDUCING ORGANO-
METALLIC COMPOUNDS
Siegfried Nitzsche and Manfred Wick, Burghausen,
Upper Bavaria, Germany, assignors to Wacker Chemie
G.m.b.H., Munich, Bavaria, Germany
No Drawing. Filed Jan. 31, 1958, Ser. No. 712,327
Claims priority, application Germany Feb. 6, 1957
8 Claims. (Cl. 75—108)

This invention relates to a method of reducing chemical compounds.

Heretofore, various chemical compounds and particularly metallic salts have been reduced by methods employing hydrogen containing inorganic silicon compounds such as polydioxodisiloxane as the reducing agent in an aqueous medium. The rate of the foregoing reduction reaction as well as the ultimate yield can be improved by employing materials which will form complex or nearly insoluble bonds with silicic acid as an additional reactant. These materials are employed in molar ratios which is, of course, unduly expensive and the method is therefore commercially unattractive. Furthermore, whereas materials such as methylene blue can be reduced by the described process, materials which are difficult to reduce, such as ketone, can not be so reduced.

It is the primary object of this invention to introduce a commercially feasible method of reducing chemical compounds which have heretofore been difficult to reduce. A further object is a method of reducing organic compounds employing silicon containing materials. Further objects and advantages are disclosed in and will be apparent from the disclosure and claims which follow.

The above objects are attained and the noted difficulties are avoided by contacting the compound which is to be reduced with an organosilicon compound containing at least some hydrogen atoms bonded to silicon by H—Si bonds, in an organic solvent medium in the presence of a hydrogen donor and a metal compound soluble in the organic solvent employed.

The compounds which can be reduced by this process include such difficultly reduced substances as acids, aldehydes, ketones and nitro compounds. Of course other organic and inorganic materials can be reduced by the method of this invention but its application is particularly directed to those materials which have heretofore resisted reduction processes.

The organosilicon compounds which are employed as reducing agents in this invention include organosilanes and organosiloxanes containing silicon bonded hydrogen atoms. The operable siloxanes can be low molecular weight cyclic organohydrogen siloxanes such as trimethyltrihydrogeno cyclictrisiloxane (i.e. $[CH_3SiHO]_3$) or linear organohydrogensiloxanes such as trimethyl silyl endblocked methyl hydrogensiloxanes

[i.e. $(CH_3)_3Si(CH_3SiHO)_xSi(CH_3)_3$]

The organic substituents present on the siloxanes and silanes operable herein can be any of the monovalent hydrocarbon radicals. Such radicals include alkyl radicals such as methyl, propyl and octadecy; aryl radicals such as phenyl and anthracyl; alkaryl radicals such as tolyl and methylnaphthyl; aralkyl such as benzyl and phenylethyl; cycloaliphatic such as cyclopropyl and cyclopentyl; and alkenyl such as vinyl and allyl. The linear siloxanes can have viscosities ranging from extremely fluid materials (i.e. viscosity of 5–10 cs. at 25° C.) to solvent soluble gumlike materials having viscosities in the range of 5–10,000,000 cs. at 25° C. Particularly useful linear siloxanes are those having viscosities in the range of 10–100 cs. at 25° C. The organosilicon compound is best employed to a slight excess, say 10% more than the theoretical quantity required.

The reduction process is carried out in the presence of an active hydrogen donor. Any compound containing active hydrogen can be employed. For example, water, alcohols and acids are hydrogen donors and are operative in this invention.

Another ingredient in the reduction reaction mixture is a metal compound which is soluble in organic solvents. Particularly useful for this purpose are the organometallic compounds such as dibutyl tin dilaurate, dibutyl tin dimaleinate and other dialkyl tin diacylates as well as phenyl mercury acetate and the like. The metal compound is employed in quantities of about 0.1 to 25% by weight based on the organosilicon compound employed. It has been found that particularly good results are achieved with 1–10% by weight of an organometallic compound.

The reduction reaction can be carried out in the presence of an organic solvent. The use of such solvent achieves more intimate contact between the reactants and permits the use of organohydrogensiloxanes which are gumlike but are soluble in organic solvents. Furthermore, the use of solvents facilitates the reduction of solvent soluble solid organic materials, it should be quite apparent that the hydrogen donor can act both as solvent and as reactant for the purposes of this invention. In such a case, it is advisable to employ a slight excess (i.e. an excess of 3–5% by weight) of active hydrogen containing composition.

The amount of catalyst to be employed depends upon whether one prefers to work without heating or whether heat is applied, too; the higher the reaction temperature, the lower naturally is the amount of catalyst necessary. Generally, amounts between $1/1000$ and $1/10$ mol are employed.

Practically all metal compounds possess the catalytic effect in the sense of the invention. It is essential for the catalytic effect that the catalytically effective metal compound is soluble in the organic medium. Thus, nickel chloride for instance has no catalytic effect, whereas nickel dibutyl dithiocarbaminate is extraordinarily effective.

There should be made a difference between metal compounds which under the conditions of the invention are not reduced, such as for instance aluminum chloride, and those compounds that can be reduced with relative ease. Metal compounds which can be reduced may be used as catalysts as well as substrates for the reduction. Particularly all metal salts of organic acids can be reduced without difficulty to the step of the free metal or, as for instance in the case of tin compounds, to the $SnH_4$. In many of these cases, the separate addition of a hydrogen donor is not necessary, because these metal compounds contain humidity and/or free fatty acids which can act as hydrogen donor.

In other cases, too, it will be sufficient for starting the reduction reaction, if small amounts of a hydrogen donor, sometimes even merely traces of humidity, alcohol or fatty acid, are present; the reduction will proceed nevertheless. Although the reaction mechanism of this reaction employing only small amounts of hydrogen donor is not quite clear, the surprising fact remains that reductions can be carried out with only traces of hydrogen donors. It seems to be possible that forms of hydrogen which in general are not regarded as being active, such as for instance the hydrogen present in ethylene and styrene, may act as hydrogen donors. When reducing certain ketones of esters, fatty acids and similar compounds it is even highly probable that hydrogen located adjacent to a carbonyl group at a carbon atom can act as donor.

The reaction products obtained by reducing metal compounds can be used in the conventional manner in reactions for which metals or metal compounds having low valences are used as catalysts, e.g. further reductions, hydrogenations, additions or polymerizations and telomerizations. Thus, it is possible for instance to contact a colloidal copper preparation obtained according to the invention with ethylene under pressure, whereby lubricating oils are formed. Colloidal metals or fine metal precipitates obtained according to the invention together with unsaturated polymerizable organic compounds, such as ethylene or styrene, quite generally lead to the formation of addition and/or polymerization compounds respectively, depending upon the conditions. If unsaturated organic compounds are directly subjected to the action of the raw, i.e. silicon-containing reaction products according to the invention which contain unreacted SiH compounds, silicon-containing telomers can be obtained; for this purpose the starting material consists of reaction products prepared by employing SiH compounds in amounts greater than those of the metal compounds to be reduced. This two-step method can in many cases be carried out in one step by reacting the unsaturated organic compounds in the presence of easily reductable metal compounds with SiH compounds.

The following examples are included to further disclose the process of this invention. These examples are not intended to restrict the scope of this invention, the scope of which is delineated by the claims.

*Example 1*

A two-necked flask was equipped with a reflux condenser and a dropping funnel and 120 g. acetophenone, 500 g. ethanol and 5 g. dibutyl tin dilaurate were placed in the flask. The flask and contents were heated in a water bath at 80° C. and 65 g. of $[CH_3SiHO]_3$ was added dropwise. After all of the siloxane had been added, the mixture was heated at 80° C. for an hour. Water (200 g.) was added to the hot reaction mixture and the mixture was mixed by stirring for 15 minutes. The reaction mixture was extracted employing trichloroethylene in a separating funnel. The trichloroethylene was distilled off. The reaction product was further distilled and 90 g. of methylphenyl carbinol was obtained. This represents a yield of 74% of the theoretically possible yield.

*Example 2*

Employing the equipment of Example 1, 60 g. of acetophenone, 5 g. of dibutyl tin dilaurate and 300 g. of methanol were heated to boiling and 100 g. of a linear methyl hydrogen polysiloxane having a viscosity in the range 10–100 cs. at 25° C. was added dropwise. After the addition of the siloxane, an exothermic, spontaneous reaction occurred. The reaction was complete after one hour. Water, which had been slightly acidified by adding $H_2SO_4$ thereto, was added to the reaction mixture whereupon an oily layer separated from the reaction mixture. This oily layer was saponified with diluted sulfuric acid and phenylmethyl carbinol was thus formed and extracted. The yield was almost quantitative.

*Example 3*

A mixture of 120 g. of nitrobenzene, 500 g. of ethyl hexanol and 3 g. of dibutyl tin dilaurate was heated to boiling while stirring. A solution of 180 g. of methyl hydrogen polysiloxane in ethyl alcohol was added in dropwise fashion to the reaction mixture. The desired reaction began immediately and the water formed during the reduction was removed continuously during the reaction. The reaction proceeded until the mixture darkened, presumably because metallic tin separated out. The reaction product, aniline, was isolated and was obtained in almost quantitative yield.

*Example 4*

Employing the method of Example 3, 150 g. of m-dinitrobenzene, 800 g. of ethyl hexanol, 3 g. dibutyl tin dilaurate and 360 g. of methyl hydrogensiloxane were admixed and the reaction product was admixed wtih diluted HCl. The reaction product was extracted with dilute NaOH solution and the desired product was isolated. A yield of over 80% of theory of phenylene diamine was obtained.

*Example 5*

Employing the method and equipment of Example 3, an almost quantitative yield of isopropyl alcohol was obtained by reducing 400 g. of acetone with 120 g. of methyl hydrogenpolysiloxane, in the presence of 5 g. of dibutyl tin dilaurate, the reaction being carried out in ethyl alcohol.

*Example 6*

Equivalent results are obtained when the dibutyl tin dilaurate in Examples 1 to 5 is replaced with dibutyl tin dimaleinate, phenyl mercury acetate, iron octoate, copper stearate, titanium butylate, nickel octoate, zirconium oxychloride, aluminum chloride, aluminum acetylacetonate, zinc stearate, lead acetate, aluminum isopropylate or cadmium caprinate.

*Example 7*

1 mol sulphur, dissolved in carbon sulphide was added to 2 mols methylhydrogenpolysiloxane and ¼ mol ethanol. After the addition of $\frac{1}{20}$ mol aluminum chloride a vivid formation of hydrogen sulphide is observed already at room temperature. Without the addition of aluminum chloride there is but little formation of $H_2S$.

*Example 8*

If titanium tetrachloride and methylhydrogenpolysiloxane are directly mixed and slightly warmed, colloidal titanium, perhaps titanium subchloride, is formed after a short time while the color turns brown, and after some time the titanium separates as a flocculate precipitate. The reduction reaction proceeds in a different manner, however, if a hydrogen donor is present. This is shown in the following two examples:

An equimolar mixture of methylhydrogenpolysiloxane and titanic acid butyl ester is dissolved in benzene which contains a small amount of butyl alcohol and allowed to stand at room temperature. A dark blue solution of titanium compounds having low valences is formed, and after some time these compounds turn dark while metallic titanium is separated.

*Example 9*

$\frac{1}{10}$ mol methylhydrogenpolysiloxane is added to $\frac{1}{100}$ mol of butyl titanate which always contains some free butanol as hydrogen donor. The flask is then washed through with nitrogen and subsequently heated for some minutes to 70° C., until the color turns blue.

The blue reduction products can be used in the polymerization of unsaturated organic compounds. To the blue reaction product obtained for instance according to Example 8 1 mol styrene, dissolved in 200 cm.³ toluene, is then added and the mixture heated to 100° C., whereafter a vivid reaction starts which continues to proceed in an exothermic manner even after the flame is removed. The reaction product is subsequently washed out with normal hydrogen chloride and then washed neutral with distilled water. After addition of 300 cm.³ ethanol a white, gelatinous precipitate separates. The solvent is decanted off and then absorbed with ether. Thereafter the product is again precipitated with ethanol and the thus obtained kneadable mass is washed several times by kneading it in fresh ethanol. The obtained polymeric thermoplastic reduction product contains 0.5% silicon firmly bound to the organic substance; it is a polystyrene having silicon-organic terminal groups. Its softening point is about 70° C.

In substantially the same manner as described above in connection with styrene, other polymerizable vinyl compounds, such as for instance ethylene, can be polymerized by reducing.

Example 10

1 mol tin tetraricenolate is dissolved in 4 mols methanol and 4 mols methylhydrogenpolysiloxane are added. After a short incubation period the reaction mass begins to boil, and metallic tin is separated. Furthermore, considerable amounts of tin hydride are evolved.

Instead of methanol alone, mixtures of methanol and benzene can likewise be used.

Example 11

In similar manner as described in Example 8 proceeds the reduction of dibutyl tin dilaurate with methylhydrogenpolysiloxane, and this even in the absence of a hydrogen donor. 1/10 mol of dibutyl tin dilaurate is mixed with 1/10 mol of methylhydrogenpolysiloxane. After a slight heating to about 60° C. a vivid reaction will occur under foaming, whereby metallic tin is separated and the odor of tin hydride is noted; finally the tin hydride is also decomposed to metallic tin.

Example 12

1 mol of monomeric butyl titanate, 1/10 mol butanol and 4 mols methylhydrogenpolysiloxane are mixed and the mixture is heated under nitrogen until it boils. A vigorous reaction occurs whereby the color of the reaction mixture at first turns blue, then brown and finally black. The product is a mixture of titanium compounds having different valences below 4.

Example 13

Equivalent results are obtained when the $(CH_3SiHO)_3$ is replaced by phenylhydrogensiloxane, vinylhydrogensiloxane, copolymeric phenylmethyl-methylhydrogensiloxane, copolymeric benzylbutyl-tolylhydrogensiloxane, or ethylhydrogensiloxane in the method of Examples 1 and 3 to 12.

In the above examples, the alcohols employed as hydrogen donors can also be replaced by acids, such as fatty acids, or water, and other liquid hydrocarbons, such as benzene, benzine and the like, can be used as solvents.

That which is claimed is:

1. The method of reducing a reducible organometallic compound consisting essentially of admixing (A) an organosilicon compond containing at least some hydrogen bonded to silicon atoms by H—Si bonding selected from the group consisting of organohydrogenhalosilanes, low molecular weight cyclic organohydrogensiloxanes and organic solvent soluble linear organohydrogensiloxanes having viscosities in the range from 5 cs. to 10,000,000 cs. at 25° C. wherein the organic substituents are monovalent hydrocarbon radicals, (B) an organic solvent medium selected from the group consisting of alcohols and liquid hydrocarbons, (C) an active hydrogen donor selected from the group consisting of water, alcohols and fatty acids, and (D) an organometallic compound selected from the group consisting of organometallic compounds of tin, mercury, iron, copper, titanium, nickel, zirconium, aluminum, zinc, lead and cadmium, said organometallic compound being soluble in the organic solvent medium (B), and heating the mixture to a temperature in the range from room temperature to the reflux temperature of the mixture.

2. The method of claim 1 wherein the organosilicon compound (A) is a low molecular weight cyclic organohydrogen siloxane wherein the organic substituents are monovalent hydrocarbon radicals.

3. The method of claim 1 wherein the organosilicon compound (A) is an organic solvent soluble linear organohydrogensiloxane having a viscosity of from 10 to 100 cs. at 25° C. wherein the organic substituents are monovalent hydrocarbon radicals.

4. The method of claim 1 wherein the active hydrogen donor (C) is used as the organic solvent medium (B).

5. The method of claim 3 wherein the organometallic compound (D) is a dialkyl tin diacylate.

6. The method of claim 5 wherein the organometallic compound (1) is dibutyl tin dilaurate.

7. The method of reducing butyltitanate consisting essentially of mixing (A) acyclic methylhydrogentrisiloxane, $(CH_3SiHO)_3$, (B) benzene, (C) butanol, and (D) butyl titanate and heating the mixture below its reflux temperature.

8. The method of reducing dibutyl tin dilaurate consisting essentially of mixing the dibutyl tin dilaurate with linear methylhydrogensiloxane polymer of 10–100 cs. viscosity at 25° C., in benzene in the presence of butyl alcohol and thereafter heating the mixture at a temperature from room temperature to the reflux temperature of the mixture.

References Cited in the file of this patent

UNITED STATES PATENTS

| | | |
|---|---|---|
| 2,156,217 | Andrews et al. | Apr. 25, 1939 |
| 2,774,690 | Cockett et al. | Dec. 18, 1956 |
| 2,781,410 | Ziegler et al. | Feb. 12, 1957 |
| 2,814,601 | Currie et al. | Nov. 26, 1957 |
| 2,823,218 | Speier et al. | Feb. 11, 1958 |
| 2,831,011 | Sommer | Apr. 15, 1958 |